June 26, 1934.   W. C. CORYELL   1,964,504
ROLLING MILL PLANT
Filed July 19, 1930    5 Sheets-Sheet 4
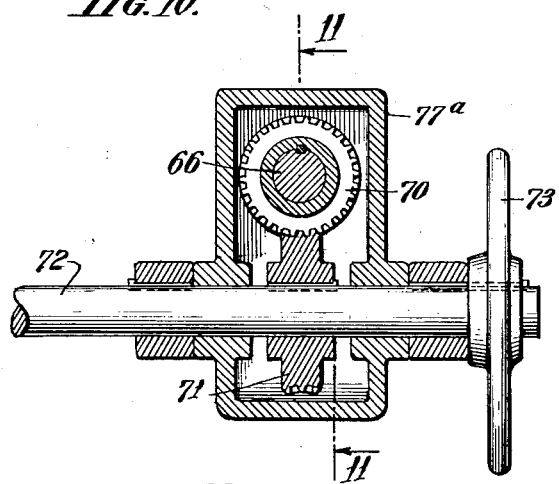
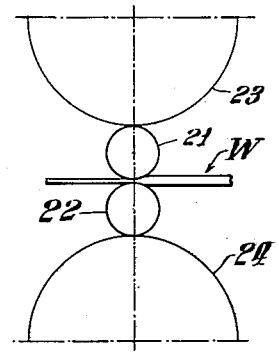
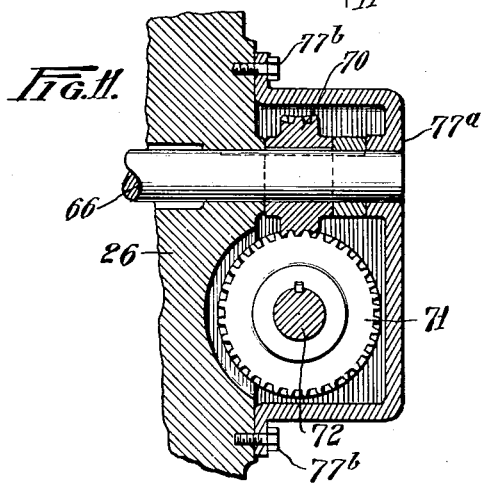
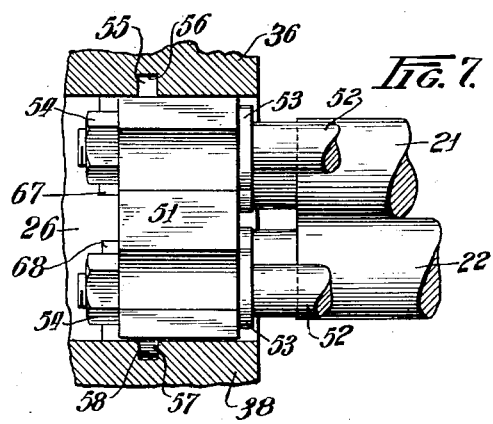
Inventor:
William C. Coryell,
By: Thomas H. Ferguson,
Att'y.

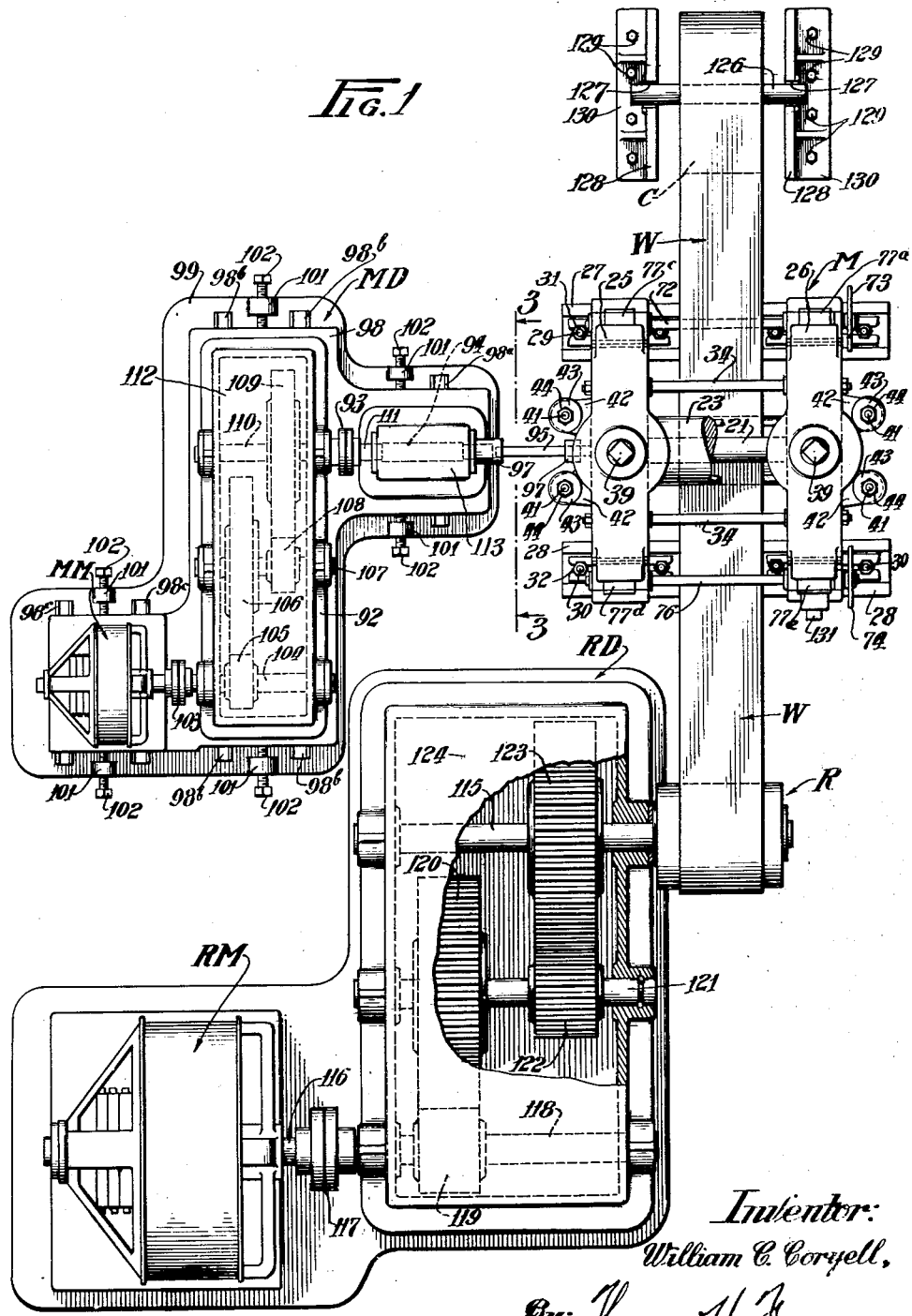

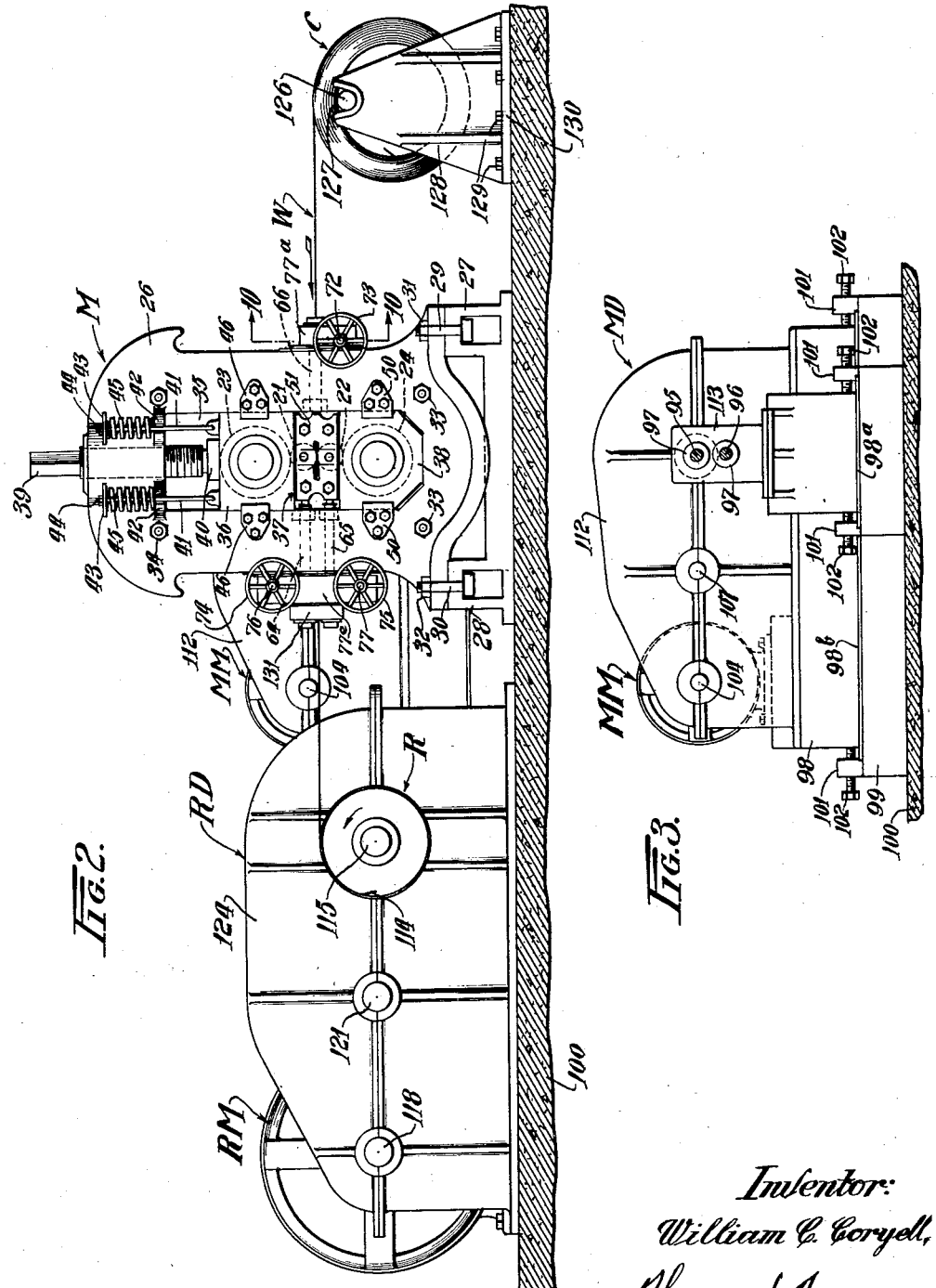

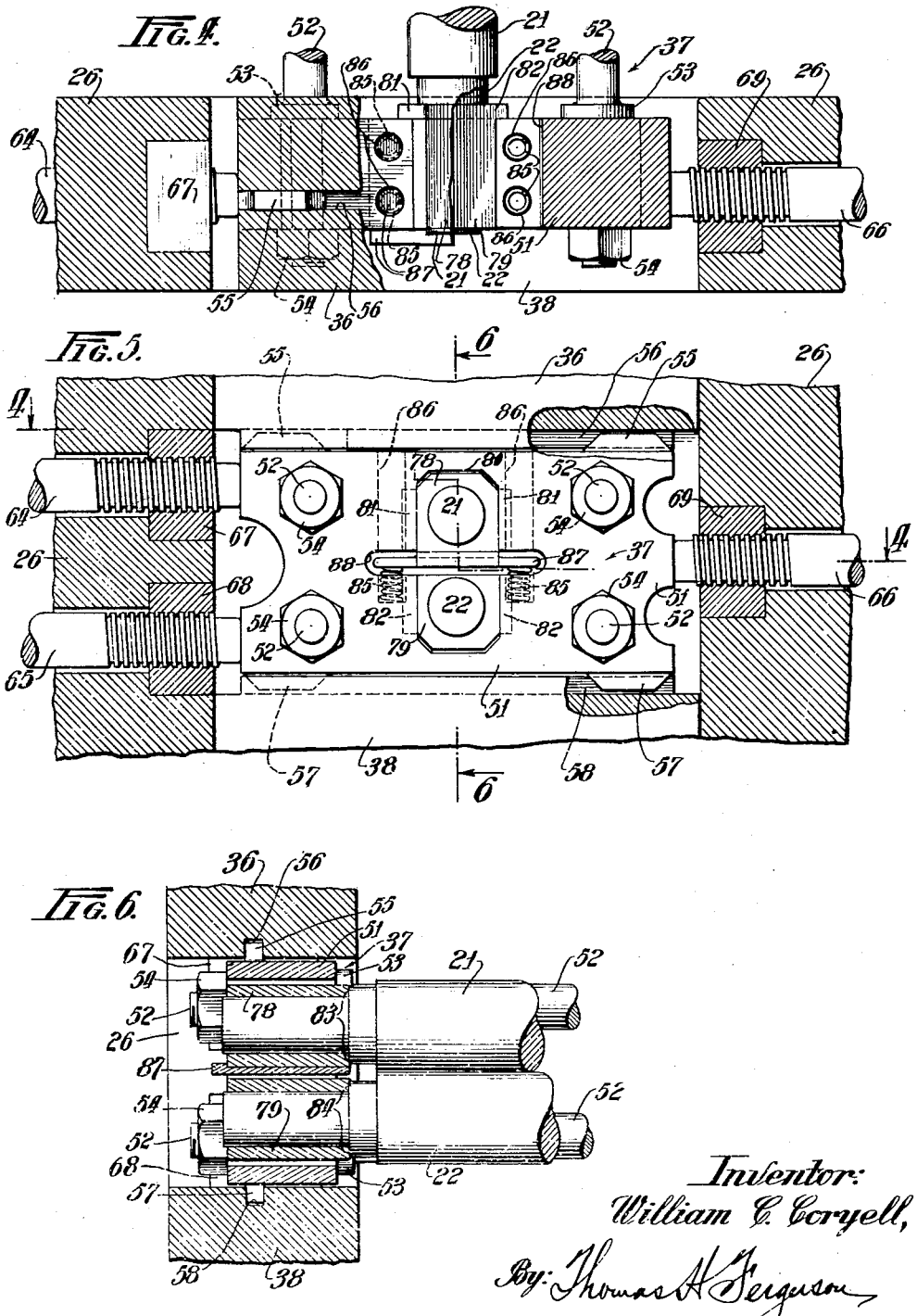

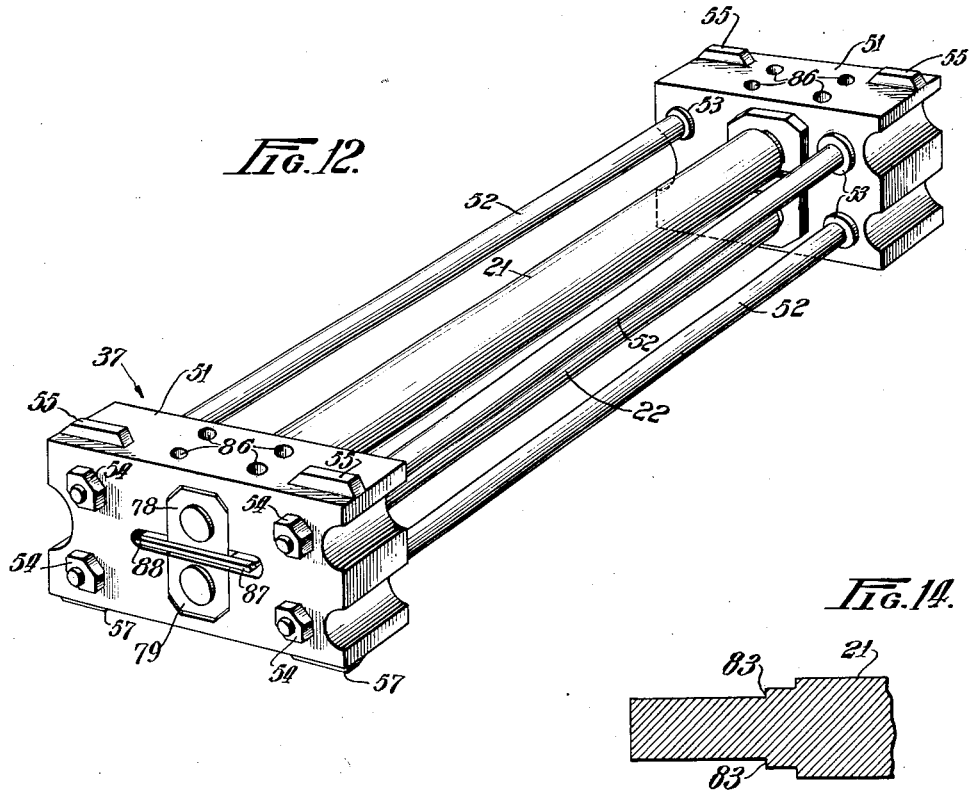
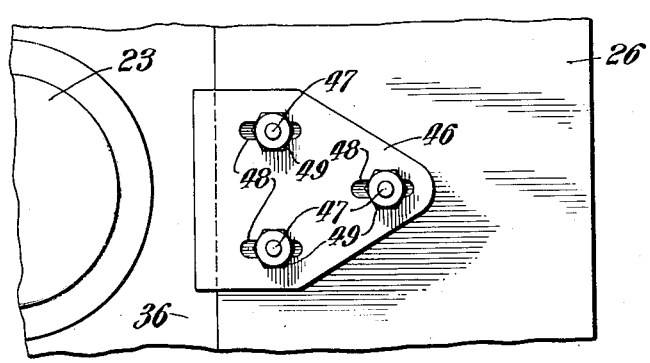

Patented June 26, 1934

1,964,504

UNITED STATES PATENT OFFICE 1,964,504

ROLLING MILL PLANT

William C. Coryell, Youngstown, Ohio, assignor, by mesne assignments, to United Engineering and Foundry Company, Pittsburgh, Pa., a corporation of Pennsylvania Application July 19, 1930, Serial No. 469,204

10 Claims. (Cl. 80—32)

The present invention relates to rolling mill plants and comprises features of invention having to do with the relation of the mill to a pulling and winding-up reel for coiling the work and at the same time applying tension thereto to stretch it as it passes from the working rolls, and novel mountings of the working rolls by which they are adjustable horizontally to bring them into different offset positions relative to the transverse axial plane of the mill.

These and other features of the invention with their several advantages will be best understood upon reference to the following detailed description taken in connection with the accompanying drawings while the scope of the invention will be particularly pointed out in the appended claims.

In said drawings, Fig. 1 is a plan view of a rolling mill plant constructed and arranged in accordance with the present invention; Fig. 2 is a side elevation of the same viewed from the mill side; Fig. 3 is a side elevation of the mill driving mechanism the spindles being shown in section on a plane indicated by the line 3—3 of Fig. 1; Fig. 4 is a partial sectional view of one end of the intermediate housing and associated parts, the planes of section being indicated by the line 4—4 of Fig. 5; Fig. 5 is an end view of the same intermediate housing and adjacent roll boxes and main housing, the latter being shown in vertical section and the former being broken away at contiguous points to show the groove and tongue connections between them; Fig. 6 is a vertical section through the intermediate housing and roll boxes in a plane indicated by the line 6—6 of Fig. 5; Fig. 7 is a side elevation of one end of the intermediate housing, parts of the adjacent roll boxes being shown in vertical section; Fig. 8 is a diagram illustrating the working rolls adjusted to a central position with their axes in the transverse axial plane of the mill; Fig. 9 is a similar diagram showing the working rolls offset; Fig. 10 is a vertical sectional view illustrating a portion of the adjusting mechanism of the intermediate housing, parts being shown in section indicated by the line 10—10 of Fig. 2; Fig. 11 is a vertical section of said adjusting mechanism taken on a plane indicated by the line 11—11 of Fig. 10; Fig. 12 is a perspective view of the intermediate housing detached from the other parts of the mill, showing the small diameter reducing rolls in position therein; Fig. 13 is an enlarged elevation of one of the holding plates by which the backing-up roll boxes are held against lateral displacement, portions of one of the boxes and the main housing being also shown; and Fig. 14 is a central vertical longtudinal section through an end portion of one of the working rolls. Throughout these views like characters refer to like parts.

Referring to the drawings in detail, M designates the mill, MD the mill driving mechanism, R the reel, RD the reel driving mechanism, MM the mill motor, RM the reel motor, and W the work constituting in the present instance metal strip being unwound from the coil C, and after it passes through the mill being wound upon the reel R.

The mill M is here shown of the four-high type and employs small working rolls 21, 22, and large backing-up rolls 23, 24. It comprises as usual the main housings 25, 26, mounted upon the shoes 27, 28, to which they are suitably secured by bolts 29, 30, having associated nuts 31, 32. Suitable separators 33, 34 keep the housings 25, 26, properly spaced. In the present instance there are two pairs of these separators but obviously any number may be employed as seems best to the designer of the mill.

Each of the main housings 25 and 26 is provided with a window 35 in which are located an upper box 36, an intermediate box housing 37, and a lower box 38. The boxes 36 and 38 in the two housings are provided with bearings for the necks of the large backing-up rolls 23, 24. Each housing is also provided with a screw-down 39 which cooperates in the usual way with a breaker 40 on the top of upper box 36. In the present instance the upper box of each housing is provided with a pair of rods 41 which pass upward through openings in lugs 42 upon the housing and receive washers 43 and nuts 44 at their upper ends. Each rod 41 is provided with a compression spring 45 which acts between the associated lug 42 and the washer 43. The tendency of these springs 45 is to raise the boxes 36. By means of the screw-downs the position of the boxes 36 is accurately determined. By screwing off the screw-downs 39 a little, the boxes are raised by the action of the springs. By screwing down the screw-downs the boxes are lowered and the springs are placed under greater compression. The boxes 36 and 38 are held against lateral displacement by plates 46 and 50 which are secured in each instance to the face of the housing and extend a short distance over the adjacent portion of the box. These plates are connected to the housing by bolts 47 which pass through slots 48 in the plates arranged so that the plates may be shifted toward and from the transverse axial plane of the mill to provide an easy and quick replacement of the intermediate housing 37 together with the rolls 21 and 22, all as a unit. Nuts 49 screwed upon the outer threaded ends of the bolts 47 serve to hold the plates firmly in adjusted position. Similar plates 50 are provided in association with the lower boxes 38. It will be apparent that other ways of holding the upper and lower boxes within the confines of the housings might be employed. The use of the plates is merely one way of performing this function. In the present instance the lower boxes 38 rest against the sills of the windows 35 and are not adjustable, but obviously these boxes might be made adjustable by counter-balances or otherwise as illustrated in my prior Patent No. 1,233,647, granted July 17, 1917.

The intermediate housing 37 is mounted so as to be moved back and forth horizontally to various offset positions, offset from the transverse axial plane of the mill in the manner indicated in Figs. 8 and 9. The ends 51 of the housing 37 are connected together and held in spaced relation by separators 52. These as usual have bearing collars 53 and threaded outer ends for retaining nuts 54. From what has been said it will be seen that the ends 51 and their connecting separators 52 constitute the rigid frame or housing 37 of the small diameter working rolls 21, 22.

With reference to the horizontal adjustment of the frame or housing 37, it may be noted that each end 51 is provided with a plurality of upper tongues 55 which are adapted to travel in a corresponding groove 56 in the under face of the associated upper box 36, and with lower tongues 57 which are adapted in like manner to travel to and fro in grooves 58 formed in the upper face of the lower box 38. By reason of this tongue and groove relation of the intermediate housing with the boxes, it will be obivous that said housing may be adjusted toward and from the transverse axial plane of the mill.

For the purpose of bringing about this horizontal adjustment sets of adjusting screws are employed. Each end member 51 has at one end a pair of screws 64, 65 and at the other end a single screw 66. The corresponding ends of the members 51 are shaped so as to provide bearing faces for the flat ends of these screws. The screws themselves are threaded in bushings 67, 68 and 69. All these bushings are located in the corresponding housing, the bushing 69 being in each case on one side of the window 35 and the corresponding bushings 67 and 68 on the other side. It will be obvious that by letting off upon the screws 66 on the one side and screwing up a little on the screws 64 and 65 on the other side, the frame 37 may be shifted in one direction and by a reverse operation it may be shifted in the opposite direction. Thus, it may be accurately set in any desired position. Ordinarily when the screws 64 and 65 are set in one position they are allowed to remain there for considerable times, the screws 66 alone being used whenever the rolls are removed, which in normal operation is usually daily. Thus, to remove the intermediate housing, the screws 66 are backed away while the screws 64 and 65 remain unmoved. The housing and rolls are removed as a unit and a new unit is put in place. The screws 66 are then set up to position, solid against the new housing. By not moving the screws 64 and 65 the alignment is not lost.

In order to establish uniformity in the movements of the screws associated with the different main housings, the corresponding screws in those housings are operated from a single control shaft. Thus in the case of the screws 66 upon the feeding-in side of the mill, each screw is provided at its outer end with a worm wheel 70 and these wheels mesh with similar worm wheels 71 mounted upon the transverse operating shaft 72. A hand-wheel 73, secured to the end of the shaft 72, may be turned to rotate the shaft and thus screw up or unscrew the screws 66 through a definite angular rotation. In like manner hand-wheels 74 and 75 are associated with control shafts 76 and 77, respectively, to control the screws 64, 65 at the delivery side of the mill. Here the shaft 76 and wheel 74 are used in operating the screws 64 and shaft 77 and wheel 75 are used in operating the screws 65. The worm wheels 70 and 71 are enclosed in a casing 77$^a$ which is secured to the adjacent housing 26 in any suitable way, as by the machine bolts 77$^b$. The casing 77$^a$ also provides bearings for the shafts 66 and 72. In like manner a housing 77$^c$ encloses the corresponding worm wheels associated with shaft 66 in housing 25. Other housings 77$^d$ and 77$^e$ similarly enclose and cooperate with the worm wheels and shafts on the housings 25 and 26 on the delivery side of the mill.

The horizontal shifting of the frame 37 brings about the offsetting of the working rolls 21, 22, but it is also necessary that these rolls may rise and fall through a limited distance with respect to the housing 37. It is also necessary that the working rolls 21 and 22 be normally separated. In order to bring about these results, the rolls 21 and 22 have their necks mounted in small boxes or bearings 78 and 79, respectively. These bearings lie in each instance in a small window or opening 80 located at the center of the housing ends 51, as clearly illustrated in Fig. 5. The bearings 78 and 79 are provided with lateral flanges 81 and 82, respectively, which engage the inner faces of the associated housing ends 51. These flanges keep the bearings 78 and 79 from passing through the windows 80 and the movement of the bearings in the opposite direction is prevented by the shoulders 83 and 84 on the rolls 21 and 22. With this construction the working rolls then have a certain freedom of movement in a vertical direction with reference to the ends 51 of the central frame or housing 37 of which they form a part. To insure an upward movement of the upper working roll 21 whenever the backing-up roll 23 will permit it, a number of compression springs 85 are employed. These springs are seated in wells or openings 86 formed in the ends 51 of the box 37 and are related to the bearings 78 and 79 as clearly shown in Figs. 4 and 5. The springs 85 rest at their lower ends upon the bottoms of the wells 86 and at their upper ends bear against the under side of a plate 87 which is located in a horizontal slot or space 88 about midway of the vertical dimension of the box ends 51. The plate 87 forms a shelf or a support upon which the upper bearing 78 of the roll 21 rests. Obviously whenever the backing-up roll 23 is raised the springs 85 will press upward upon the plate 87 and thus raise the bearing 78 and the adjacent end of the roll 21. The receding of the backing-up roll will allow this action to take place at both ends of the working roll 21 and consequently the latter will move upward the same distance at all points in its length.

The mill driving mechanism MD includes the mill motor MM, the reduction gearing 92, a slip clutch 93, the usual pinions 94, and the associated spindles 95, 96 and couplings 97. The motor MM, gearing 92, slip clutch 93, pinions 94 and their associated supporting parts are all mounted upon a movable base 98 which is located at the driven end of the mill rolls and is capable of movement on shoes 98$^a$, 98$^b$ and 98$^c$ in a direction parallel to the direction of travel of the work W through the mill M.

A sub-base 99 carries the shoes 98$^a$, 98$^b$ and 98$^c$ and through them supports the movable base 98. The sub-base 99 is mounted in turn upon a suitable foundation, such as the concrete foundation 100. The base 99 is provided with six upstanding lugs 101 which are paired and located at the rear and forward edges of the base 98. Each pair of lugs is separated by distance a little greater than the intervening portion of the base 98. Consequently there is space for movement of the base 98 forward and back relative to the base 99. To bring about this movement and to fix the base 98 in an adjusted position, adjusting screws 102 are provided, one for each lug. These screws are threaded through threaded openings in the lugs 101 and bear at their inner ends against different portions of the base 98. Obviously by letting off on the screws at the forward side of the base and turning up upon the screws upon the rear side, the base 98 may be advanced through a short distance depending upon the extent through which the screws have been turned. Likewise a reversal in the operation of the screws would bring about a movement in the opposite direction. Since the movement of the base 98 by the screws is in a direction parallel to that of the travel of the work W it is in the same direction as the adjusting movement of the intermediate housing 37 and the working rolls 21 and 22 carried by it. Since this is true, the offsetting of the rolls to any given extent may be accompanied by a shifting of the base 98 to the same extent, thus bringing the pinions 94 and the connecting spindles 95 and 96 into alignment with the offset rolls 21 and 22. In other words, it is possible by shifting the base 98 to offset the motor driving mechanism to the same extent that the working rolls are offset. In this way a good alignment may be maintained at all times between the working rolls of the mill M and the various parts of the mill driving mechanism MD.

The motor MM is preferably an electric motor firmly secured to the movable base 98. The shaft of the motor MM is connected by a coupling 103 to the shaft 104 of the reduction gearing 92. The shaft 104 carries a pinion 105 which meshes with a gear wheel 106 on an intermediate shaft 107. The latter shaft in turn carries a pinion 108 which meshes with a gear wheel 109 upon the shaft 110 of the same mechanism. The shaft 110 is in line with the shaft 111 of one of the pinions 94. The slip clutch 93 connects the aligned shafts 110 and 111. The construction of this clutch 93 is such that whenever the speed of the shaft 110 tends to exceed that of the shaft 111 the clutch will transmit power from shaft 110 to shaft 111, but in case the shaft 111 should outrun shaft 110 then the clutch 93 will slip and allow the shaft 111 to so outrun shaft 110. The shafts 104, 107 and 110 of the reduction gear are mounted in bearings in a suitable casing 112. Likewise the pinions 94 are located one above the other as is common and are journaled in bearings formed in the pinion casing 113. These casings 112 and 113 are secured to the movable base 98. The spindles 95 and 96 are connected at their driven ends to the shafts of the two driving pinions 94, one set of couplings 97 serving to make the connection.

The opposite ends of the spindles 95 and 96 are similarly connected by a second set of couplings 97 to the necks of the working rolls 21 and 22. Obviously when the motor MM is driven by current supplied to it, power will be transmitted from it through the reduction gearing 92 and the friction clutch 93 to the pinions 94 and from these through the spindles 95 and 96 to the working rolls 21 and 22, respectively. As before stated the friction clutch 93 will not slip unless the speed of the shaft 111 exceeds the speed of the shaft 110. This will not occur unless force be applied to the work W to cause the working rolls 21 and 22 to drive the shaft 111 at such higher speed. The purpose of this installation is to so drive the working rolls. In other words, with the installation herein disclosed, the work W will drive the working rolls. This is why the reel R is driven by a motor RM which is larger, and capable of delivering more energy, than the mill motor MM. The motor RM is geared so as to pull the piece at a linear speed faster than the mill motor MM will deliver it.

The reel R is of usual construction and is provided with a suitable slot for receiving the end of the work, as indicated at 114, and clamping mechanism to hold the end of the work securely to the reel. These parts are well known and standing alone are not part of the present invention and therefore need not be fully described or shown. The reel is mounted upon a shaft 115 which is driven from the reel motor RM. The shaft 116 of the latter is connected by a coupling 117 to shaft 118 of the reel driving mechanism RD. Upon the shaft 118 is a pinion 119 which meshes with gear wheel 120 on the intermediate shaft 121. The latter in turn has a pinion 122 which meshes with gear wheel 123 on shaft 115. The shafts 115, 118, and 121 are mounted in suitable bearings in the casing 124 of the driving mechanism RD. As shown, the shaft 115 projects beyond the casing 124 and its protruding end receives the reel R. The motor RM and the driving mechanism RD are suitably mounted upon the concrete foundation 100.

The work W may be brought to the mill as a long piece or it may be brought to the mill as a strip wound up into a coil C. When it comes as a long piece its forward end is fed between the working rolls with the rear end traveling upon the floor or other surface. When it comes as a coil, the coil is slipped over a bar 126 which rests at its ends in notch or pocket bearings 127 formed in the upper ends of supports 128, 128 secured to the floor, preferably by bolts 129 passing through base flanges 130 at the bottom of said supports. Of course, any other way of supporting the coil C which will enable its free end to be withdrawn and fed through the mill will be quite satisfactory.

When the forward end of the work W is passed between the working rolls 21 and 22, the motor MM drives these rolls and the end of the work is carried forward through the mill. When the forward end has been advanced far enough to engage it in the slot 114 of the reel R then such engagement is made and motor RM is started. When the work is firmly clamped, the speed of the motor RM is increased and the work is coiled up as a strip on the drum R. When it has been fully coiled it is tied and removed from the drum as a coil to be again placed on the bar 126 and fed through the mill for another reduction. Of course, in practice several coils are usually passed through the mill at one setting of the mill rolls. Later the same coils are passed through the mill again at a new setting. This may be done as many times as desired. When the work is once firmly attached to the reel R the latter may be run at a peripheral speed in excess of the peripheral speed of the working rolls. In such case the reel will pull upon the end of the work W and stretch it and cause the working rolls to travel at a greater speed than they would travel by reason of the driving motor MM. In such case the friction clutch 93 operates to allow the more rapid rotation of the shaft 111 over shaft 110 as before mentioned. In practice a peripheral speed of 100 feet per minute has been attained at the roll R while the motor MM and the associated gearing was arranged to provide a speed of 75 feet per minute. In one installation the motor MM is a variable speed motor varying from 300 to 1200 revolutions per minute as the operator may determine. The slow speed is used on the early roughing passes where the reduction is heavy, and the higher speeds on the lighter finishing passes.

Ordinarily in a given installation quite a large electric switch board plant is required for operating and controlling the motors MM and RM, but since the same constitutes no part of the invention set forth herein, no attempt has been made to disclose the electrical control apparatus employed. Suffice it to say that manual control switches are located near by, in places convenient to the operator of the mill. In the installation illustrated, such switches are present in a switch box 131 shown on the delivery side of the rolls.

In adjusting the mill for any particular set of conditions, the working rolls 21 and 22 are offset toward the feeding-in side. In Fig. 8 the working rolls are shown without any offset. There they lie with their axes in the transverse axial plane of the mill. In this adjustment, the axes of the four rolls 21, 22, 23 and 24 lie in this one plane. When the working rolls are offset as stated, the backing-up rolls 23 and 24 remain with their axes in this same transverse axial plane of the mill, but the axes of the working rolls are offset toward the feeding-in side of the mill from that plane. An example is illustrated in Fig. 9. The extent of offsetting should be such that the reaction at the time the work is passing between the rolls 21 and 22 will extend through axes of the backing-up rolls as indicated by the arrows 132 and 133 in Fig. 9. This offset distance can be accurately calculated and determined for any assumed case; but in practice there are variations in the condition of the work, the condition of the rolls and other factors which come in to upset the theoretical case and from moment to moment and from piece to piece change the theoretically correct distance. Ordinarily the proper amount of offset is determined in practice by trying out different adjustments until the best is obtained. Calculations may be used in many instances to assist the operator in the setting of the rolls.

When the working rolls 21 and 22 have been properly offset then the spindles 95 and 96 and their associated pinions 94 should be brought into line with the working rolls. This is brought about by shifting the base 98 by means of the adjusting screws 102 as before explained.

Although different embodiments of my invention may vary greatly in the relative sizes of the parts, yet it may be helpful to state sizes which I have employed in one installation which is now in service. Such sizes of course are only illustrative and must be so taken.

In the plant to which I refer, the working rolls were each 6 inches in diameter with a 16 inch face and the backing up rolls were each 20 inches in diameter and had a like face of 16 inches. The mill and reel motors were 75 and 150 horse power motors respectively. The speeds were 850 revolutions per minute for the small motor and from 300 to 1200 revolutions per minute for the large motor. The reel was 24 inches in diameter and had about a 30 inch face. And the reduction gears were suitably designed to transmit the maximum power delivered by the motors with a proper reduction in speed, the pitch diameters being in the case of the larger gearing 8, 30, 10 and 24 inches respectively, and in the case of the smaller gearing 5, 20¼, 7 and 30⅓ inches respectively.

Of course, dimensions are matters of design but, it is believed, the values given may in some instances serve as a valuable basis for comparison.

What I claim as new and desire to secure by Letters Patent of the United States is:

1. In a rolling mill having backing-up and working rolls, main housings, upper and lower boxes for said backing-up rolls mounted in said housings for vertical adjustment, intermediate boxes for said working rolls, a single unitary intermediate housing for all of said intermediate boxes, said intermediate housing being removably mounted between said upper and lower boxes and adjustable therebetween to and fro in the direction of travel of the work, and means for adjusting said intermediate housing.

2. In a rolling mill having backing-up and working rolls, main housings, upper and lower boxes for said backing-up rolls mounted in said main housings for vertical adjustment, intermediate boxes for said working rolls, a single unitary intermediate housing for all of said intermediate boxes, said intermediate housing being removably mounted between said upper and lower boxes and adjustable therebetween to and fro in the direction of travel of the work and a plurality of adjusting devices at each end of said intermediate housing for horizontally positioning the same.

3. In a rolling mill having backing-up and working rolls, main housings, upper and lower boxes for said backing-up rolls mounted in said main housings for vertical adjustment, intermediate boxes for said working rolls, a single unitary intermediate housing for all of said intermediate boxes, said intermediate housing being removably mounted between said upper and lower boxes and horizontally adjustable therebetween to and fro in the direction of travel of the work, three adjusting screws at each end of said intermediate housing for engaging the same, two on one side and one on the other, and mountings in said main housings for each set of three screws whereby the same may be turned to adjust said intermediate housing horizontally.

4. In a rolling mill having backing-up and working rolls, main housings, upper and lower boxes for said backing-up rolls mounted in said main housings for vertical adjustment, intermediate boxes for said working rolls, a single unitary intermediate housing for all of said intermediate boxes, said intermediate housing being removably mounted between said upper and lower boxes and adjustable therebetween to and fro in the direction of travel of the work, three screws for engaging each end of said intermediate housing, each set having two on one side and one on the other, mountings in said main housings for each set of three screws whereby the same may be turned to adjust said intermediate housing horizontally, and screws and counterbalancing means for vertically adjusting said upper boxes.

5. In a rolling mill having backing-up and working rolls, main housings, upper and lower boxes for said backing-up rolls mounted in said main housings for vertical adjustment, intermediate boxes for said working rolls, a single unitary intermediate housing for all of said intermediate boxes, said intermediate housing being removably mounted between said upper and lower boxes and adjustable therebetween to and fro in the direction of travel of the work, screws for adjusting said upper boxes and intermediate housing, vertically movable upper and lower boxes in said intermediate housing for said working rolls, and springs acting between said intermediate housing and said last mentioned upper bearings tending to separate said working rolls.

6. A four-high mill having working rolls and backing-up rolls, means for supporting and relatively adjusting said backing-up rolls vertically, boxes for said working rolls, a single unitary frame or housing positioned in a horizontal plane between said backing-up rolls and supporting said boxes by its end members, and means for adjusting said housing in said horizontal plane to and fro in the direction of the travel of the work through the mill.

7. A four-high mill having working rolls and backing-up rolls, means for supporting and relatively adjusting said backing-up rolls vertically, boxes for said working rolls, a single unitary frame or housing positioned in a horizontal plane between said packing-up rolls and supporting said boxes by its end members, and adjusting screws for engaging said end members to adjust said housing in said horizontal plane to and fro in the direction of travel of the work through the mill.

8. In a rolling mill having backing-up and working rolls, main housings, upper and lower boxes for said backing-up rolls mounted in said housings for vertical adjustment, intermediate boxes for said working rolls, two intermediate housing members located respectively at the ends of said working rolls and supporting said intermediate boxes, said housing members being removably mounted between said upper and lower boxes and adjustable therebetween to and fro in the direction of travel of the work, and means for adjusting said housing members in said direction of travel.

9. In a rolling mill having backing-up and working rolls, main housings, upper and lower boxes for said backing-up rolls mounted in said housings for vertical adjustment, intermediate boxes for said working rolls, two intermediate housing members located respectively at the ends of said working rolls and supporting said intermediate boxes, said housing members being removably mounted between said upper and lower boxes and adjustable therebetween to and fro in the direction of travel of the work, and a plurality of adjusting devices on opposite sides of each of said housing members for adjusting said housing members in said direction of travel.

10. In a rolling mill having backing-up and working rolls, main housings, upper and lower boxes for said backing-up rolls mounted in said housings for vertical adjustment, intermediate boxes for said working rolls, two intermediate housing members located respectively at the ends of said working rolls and supporting said intermediate boxes, said housing members being removably mounted between said upper and lower boxes and adjustable therebetween to and fro in the direction of travel of the work, three adjusting screws associated with each of said housing members, two on one side and one on the other, and mountings in said main housings for each set of three screws whereby the same may be turned to adjust said housing members in said direction of travel.

WILLIAM C. CORYELL.